United States Patent
Vatani et al.

(10) Patent No.: US 12,005,648 B2
(45) Date of Patent: Jun. 11, 2024

(54) APPARATUS AND METHOD TO REMOVE POWDER WITH FLEXIBLE SCRAPER BLADE AND ADJUSTABLE SIDE NOZZLES

(71) Applicant: Sakuu Corporation, San Jose, CA (US)

(72) Inventors: Morteza Vatani, Los Gatos, CA (US); Timothy Byman, Saint Michael, MN (US); Justin Carroll, Vadnais Height, MN (US)

(73) Assignee: Sakuu Corporation, San Jose, CA (US)

( * ) Notice: Subject to any disclaimer, the term of this patent is extended or adjusted under 35 U.S.C. 154(b) by 0 days.

(21) Appl. No.: 18/074,173

(22) Filed: Dec. 2, 2022

(65) Prior Publication Data

US 2023/0226766 A1  Jul. 20, 2023

Related U.S. Application Data

(60) Provisional application No. 63/299,802, filed on Jan. 14, 2022.

(51) Int. Cl.
| | |
|---|---|
| *B29C 64/35* | (2017.01) |
| *B29C 64/209* | (2017.01) |
| *B29C 64/214* | (2017.01) |
| *B08B 5/04* | (2006.01) |
| *B22F 12/67* | (2021.01) |
| *B29C 64/153* | (2017.01) |
| *B33Y 30/00* | (2015.01) |
| *B33Y 40/00* | (2020.01) |

(52) U.S. Cl.
CPC ............ *B29C 64/35* (2017.08); *B29C 64/209* (2017.08); *B29C 64/214* (2017.08); *B08B 5/04* (2013.01); *B22F 12/67* (2021.01); *B29C 64/153* (2017.08); *B33Y 30/00* (2014.12); *B33Y 40/00* (2014.12)

(58) Field of Classification Search
CPC ..... B29C 64/35; B29C 64/214; B29C 64/209; B29C 64/153; B33Y 30/00; B33Y 40/00; B08B 1/005; B08B 1/007; B08B 1/008; B08B 5/04; B22F 12/67
USPC .......................................................... 425/11
See application file for complete search history.

(56) References Cited

U.S. PATENT DOCUMENTS

| 10,384,265 B2 | 8/2019 | Swaminathan et al. |
| 2012/0211155 A1* | 8/2012 | Wehning ............ A61C 13/0018 156/380.9 |
| 2018/0126650 A1* | 5/2018 | Murphree ................ B29C 64/25 |
| 2018/0297284 A1* | 10/2018 | Fulop ...................... B29C 64/35 |

(Continued)

OTHER PUBLICATIONS

International Search Report and Written Opinion dated Apr. 21, 2023 in corresponding PCT/US23/60759 filed Jan. 17, 2023—13 pages.

*Primary Examiner* — Nahida Sultana
*Assistant Examiner* — Lawrence D. Hohenbrink, Jr.

(57) ABSTRACT

An improved apparatus and method are provided to remove powder from a web, for example, in a 3D printing apparatus. A flexible blade is provided to contact and move across a first portion of the web located between adjacent portions of the web to scrape powder from the first portion without removing powder deposited on the adjacent portions. A pair of edge vacuum nozzles and a central vacuum nozzle are also provided to move with the flexible blade to remove powder from both edges of the first portion and a central region of the first portion.

25 Claims, 4 Drawing Sheets

(56) References Cited

U.S. PATENT DOCUMENTS

| | | |
|---|---|---|
| 2018/0311769 A1 | 11/2018 | TenHouten et al. |
| 2018/0370213 A1 | 12/2018 | Gold et al. |
| 2020/0316854 A1* | 10/2020 | Daniels .................. B33Y 30/00 |
| 2021/0046519 A1 | 2/2021 | Go et al. |
| 2021/0094102 A1 | 4/2021 | Lin et al. |

* cited by examiner

APPARATUS AND METHOD TO REMOVE POWDER WITH FLEXIBLE SCRAPER BLADE AND ADJUSTABLE SIDE NOZZLES

FIELD OF THE INVENTION AND BACKGROUND

The present disclosure pertains to an improved apparatus and method to remove powder from a substrate in an additive manufacturing (AM) apparatus. Specifically, in current binder jetting 3D printing, there is a need for substantially completely removing unnecessary powder that has been deposited in regions on a substrate that are not necessary for a device being printed on the substrate, for example, in areas of a substrate that are to be cut between adjacent print layers formed on the substrate.

SUMMARY OF THE INVENTION

In an implementation, an apparatus is provided for removing powder from a substrate that has powder deposited thereon, including a blade configured to contact and move across a first portion of the substrate located between adjacent portions of the substrate to scrape powder from the first portion without scraping powder deposited on the adjacent portions, and a pair of edge vacuum nozzles and a central vacuum nozzle, located between the pair of edge vacuum nozzles, wherein each edge vacuum nozzles and the central vacuum nozzle is configured to move with the blade to remove powder from both edges of the first portion and a central region of the first portion, without removing powder deposited on the adjacent portions, after the powder has been scraped by the blade.

In another implementation, an apparatus is provided for removing powder from a web that has powder deposited thereon, a flexible blade configured to contact and move across a first portion of the web located between a second portion of the web, on one side of the first portion, and a third portion of the web, on a second side of the first portion, opposite the second portion, to remove powder deposited on the first portion without removing powder deposited on the second and third portions, and a pair of edge vacuum nozzles, configured to move with the flexible blade across the first portion, comprised of a first edge vacuum nozzle located adjacent to a first edge of the flexible blade and adjacent to a boundary of the first and second portions of the web while the flexible blade moves across the first portion, and a second edge vacuum nozzle, located adjacent to a second edge of the flexible blade, opposite to the first edge of the flexible blade, and adjacent to a boundary of the first and third portions of the web while the flexible blade moves across the first portion, wherein the first and second edge vacuum nozzles are configured to respectively vacuum up powder, scraped by the flexible blade in the first portion.

In another implementation, a method is provided for removing powder from a substrate that has powder deposited thereon, contacting and moving a blade across a first portion of the substrate located between adjacent portions of the substrate to scrape powder from the first portion without scraping powder deposited on the adjacent portions, and removing powder from both edges of the first portion and a central region of the first portion, without removing powder deposited on the adjacent portions, after the powder has been scraped by the blade using a pair of edge vacuum nozzles and a central vacuum nozzle, located between the pair of edge vacuum nozzles.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

As described in a related provisional application 63/299,867, filed Jan. 14, 2022, by the Applicant, entitled "Printing Method and Apparatus for Additive Manufacturing, Including In-situ Powder Regeneration," and which is hereby incorporated by reference, a platform for AM manufacturing has been developed which is a modular base machine that builds each layer separately. Each individual layer passes several stations, and each station has a unique function. One of these stations includes powder removal at an early stage of the process, prior to lubrication/wetting and compaction of the powder, and prior to segmenting of substrates that the powder layers are formed on. Thus, a method and an apparatus are disclosed herein which are particularly adapted to the new platform described in the above-noted related application. Specifically, in the platform described in this related application, due to the nature of the platform, portions of the powder layers can be removed to facilitate segmenting of a substrate that the remaining portions of the powder layers are formed on, in accordance with the overall operation described in the above-noted related application.

Figure 1:
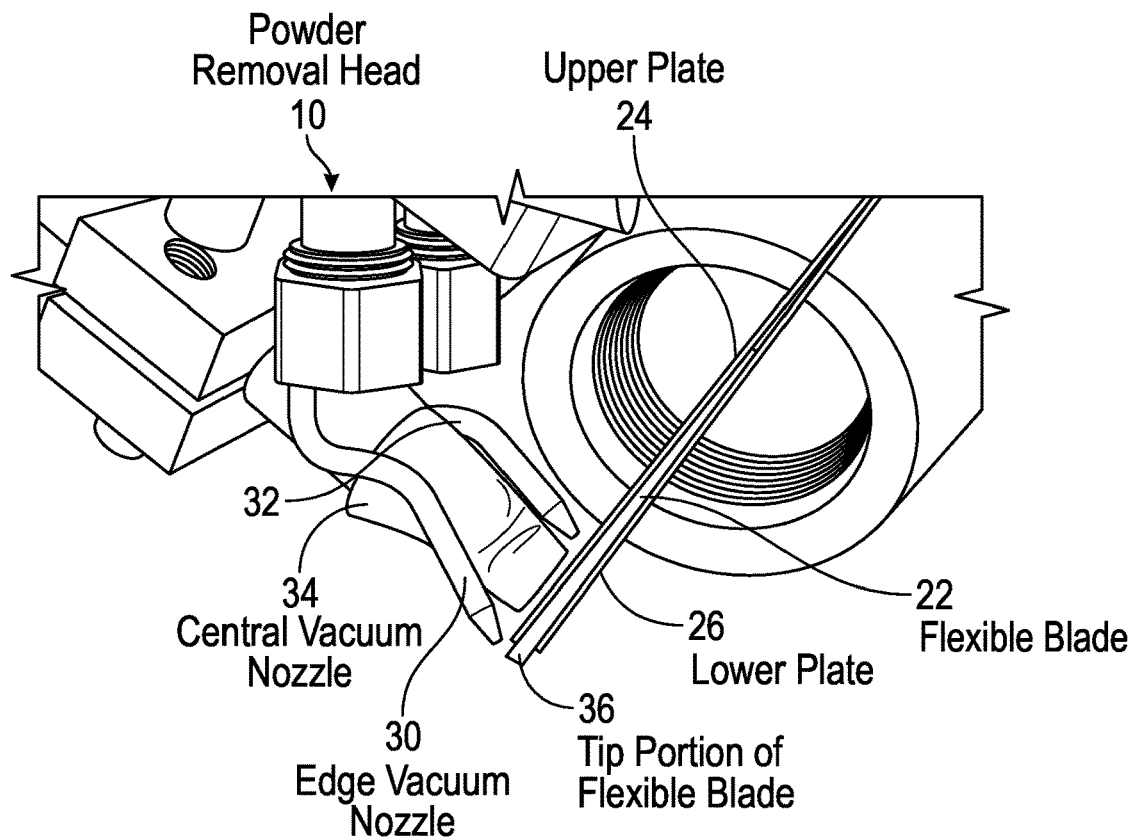
FIG. 1 illustrates a perspective view of a powder removal apparatus located above a substrate in a 3D printing apparatus in accordance with aspects of the present disclosure.

Referring to FIG. 1, a powder removal head 10 is shown. As will be described below with reference to FIG. 2, this powder removal head 10 is configured to be passed over a substrate 12, for example a web, which has powder 14 deposited thereon, in order to remove a portion of the powder 14 from the web 12. This can be useful, for example, in a situation where it is desired to clean a portion of the web 12 by removing the powder 14 from that portion of the web, between adjacent portions of the web where the powder 14 is to remain for further processing by a 3D printer to form printed layers. It is noted that, although the following description is provided, for convenience, in terms of the substrate 12 being a web, other substrate arrangements could be used, if desired.

Figure 2:
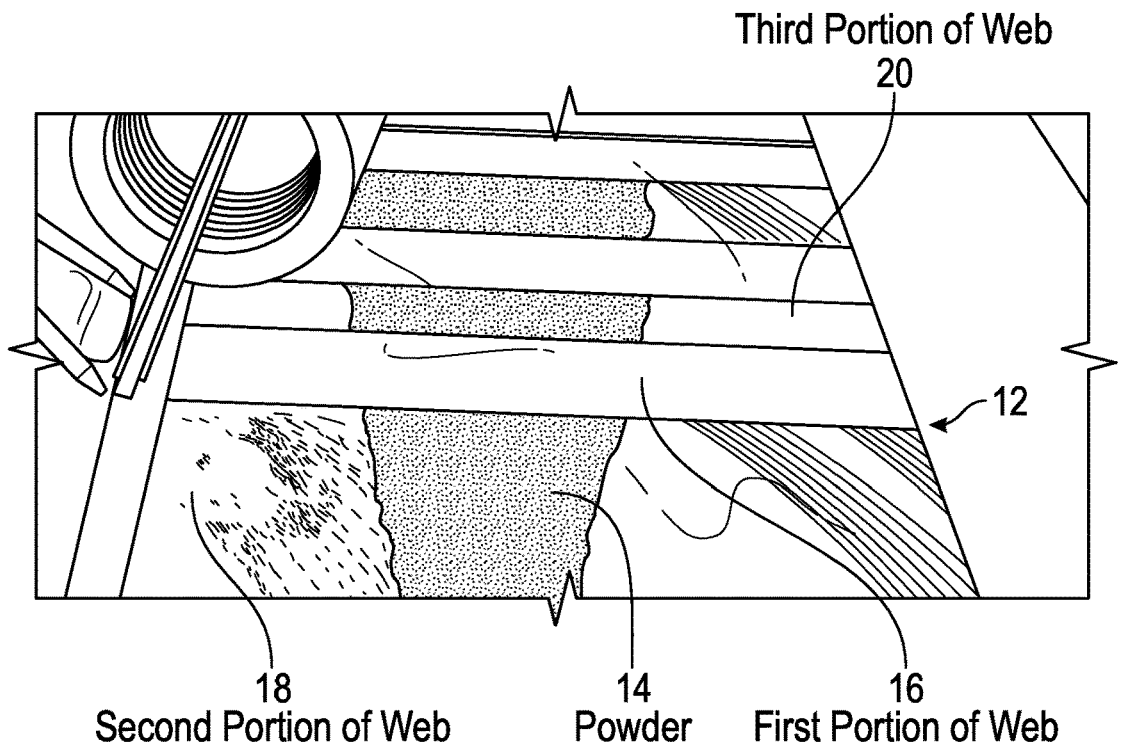
FIG. 2 illustrates a perspective view of the powder removal apparatus after it has removed a section of powder on a substrate (web) in accordance with aspects of the present disclosure.

FIG. 2 shows an example of a practical application of the current disclosure where the powder removal head 10 has been moved across a first portion 16 of the web 12 to remove powder 14 from a strip between a second portion 18 of the web, on one side of the first portion 16, and a third portion 20 of the web, on an opposite side of the first portion 16. As can be appreciated from FIG. 2, the powder remains on the second and third portions of the web, for further processing in the 3D printer, whereas, by virtue of the elements of the powder removal head discussed below with respect to the accompanying drawings, the powder is completely removed from the first strip portion of the web.

Referring again to FIG. 1, it can be seen that the powder removal head 10 includes a blade 22 sandwiched between an upper plate 24 and a lower plate 26. This blade 22 can be flexible, as shown in FIG. 1, or, in alternative implementations, inflexible. In implementations where an inflexible blade is used, it can be hinged at an end opposite to a portion which contacts the web 12, so as to provide movement of the blade 22 to adjust the movement of the blade, if desired, to move vertically to adjust to surface irregularities as the blade 22 moves across a surface of the substrate 12 (e.g., web). Although the following description pertains to the use of a flexible blade 22, it is to be understood that this description could be utilized with regard to an inflexible blade as well.

The powder removal head 10 also includes a pair of edge vacuum nozzles 30 and 32, located adjacent to the opposite edges of the flexible blade 22, and a central vacuum nozzle 34, located between the pair of edge vacuum nozzles 30 and 32, and also located adjacent a lower portion of the flexible blade 22. As can be seen in FIG. 1, a small end portion, hereinafter referred to as the tip 36 of the flexible blade 22, extends beyond lower end portions of the upper plate and the lower plate. This tip 36 of the flexible blade 22 is the only portion of the flexible blade 22 which will come into contact with the web 12 on which powder 14 has been deposited. The amount by which the tip 36 of the flexible blade 22 extends beyond the upper and lower plates 24 and 26 may vary based on the specific powder 14 that is deposited, depending upon powder size, for example.

In accordance with aspects of the present disclosure, the flexible blade 22 can be made of a soft "squeegee" style material sandwiched between the two plates (e.g., the upper plate 24 and the lower plate 26 shown in FIG. 1), although other relatively soft flexible materials could be used. The tip 36 of the squeegee style flexible blade 22 is the only material to touch the web 12, so the material used for the flexible blade 22 should be chosen as a material which will prevent damage to the web 12 as the tip 36 of the flexible blade 22 scrapes over the web 12 to remove powder 14 from the web in the desired first portion 16 (see FIG. 2). The material chosen for use as a flexible blade 22 may also depend on the specific chemistry of the powder 14, with a desire to select a blade material to which the powder does not adhere or react. Typically, the web 12 can be formed of a mylar material, although other materials can also be used. The two plates 24 and 26 provide rigidity to the squeegee material (or other soft material), so it does not collapse when moving forward to scrape along the web 12. These upper and lower plates 24 and 26 can be formed, for example, of metal or rigid plastic material. In accordance with aspects of the present disclosure, the upper and lower plates 24 and 26 are substantially rigid, or, at least, substantially less flexible than the flexible blade 22. The two plates 24 and 26 may also be configured to facilitate the flexible blade 22 to be replaced as required.

Still referring to FIG. 1, the two edge vacuum nozzles (or tubes) 30 and 32 control edge vacuuming of powder along edges of the first portion of the web 12 that is being stripped of powder 14 (e.g., see FIG. 2). In other words, the edge vacuum nozzles 30 and 32 vacuum up powder 14 at the boundaries between the first portion 16 of the web and the adjoining second and third portions 18 and 20 of the web 12, which powder 14 has been scraped by the tip 36 of the flexible blade 22 while it passes over the first portion 16 of the web. The central vacuum nozzle 34 removes all the rest of the powder 14 on the first portion 16 of the web 12 that has been loosened and scraped by the extended tip 36 of the flexible blade 22 while it passes over the first portion 16 of the web 12. FIG. 2 shows a removal of powder 14 of one pass of the powder removal head 10 across the first portion 16 of the web 14. As shown in FIG. 2, the powder 14 is completely removed from the web 12 (e.g., mylar) by just one pass, while the powder 14 remains in the adjoining second and third portions 18 and 20 of the web 12 so that the powder 14 in these regions can be subsequently processed in the 3D printer.

Figure 3:
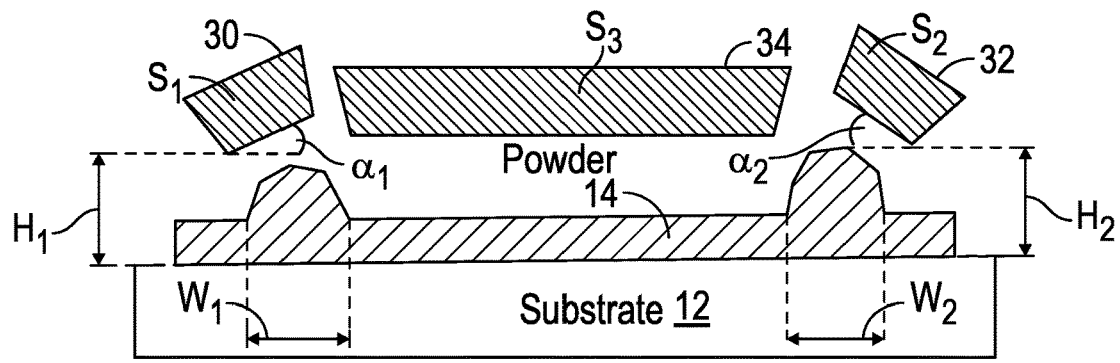
FIG. 3 illustrates a view of the powder removal apparatus located above a substrate on which powder is deposited in accordance with aspects of the present disclosure.

In operation, as the flexible blade 22 is passed over a surface of the substrate 12, the powder 14 is pushed towards the central nozzle 34 and edge nozzles 30 and 32, and due to flowability of the powder 14, displaced powder may tend to "heap" at the edges (refer to FIG. 3). The edge nozzles 30 and 32 are positioned and oriented to capture some if not substantially all the displaced powder 14. The edge nozzles 30 and 32 can be individually/independently moved/oriented, and the vacuum pressure can be modified to be different for these edge nozzles 30 and 32 than that of the central vacuum nozzle 34. In other words, the vacuum supplied by the edge vacuum nozzles 30 and 32 can be either greater than or less than the vacuum applied by the central vacuum nozzle 34, depending upon the requirements for satisfactorily vacuuming powder 14 in both the central region and the edge regions of the first portion 16 of the web 12. For this purpose, as shown in FIG. 1, each of the edge vacuum nozzles 30 and 32 has its own separate vacuum tube that it is connected to. The central vacuum nozzle 34 also is connected to its own vacuum tube. Thus, each of the edge vacuum nozzles 30 and 32, and the central vacuum nozzle 34, can be independently controlled from one another to have the optimum vacuum for the particular powder 14 being used.

Each of the nozzles 30, 32 and 34 may be configured to operate independent of the others. For example, each nozzle 30, 32 and 34 may include an assembly to independently vary the size of the diameter of the aperture or opening of the respective nozzle, thereby regulating flow through the nozzle to allow independent control of the pickup velocity of each of the nozzles. In one implementation, the diameter variation may be adjustable by predetermined increments, with a predetermined nozzle diameter value based on characteristics or parameters of the powder, such as particle size, particle density, or particle weight, for example. In another implementation, the diameter of the nozzles may be dynamically adjustable, allowing conditions to be satisfied in the nozzle opening or aperture to provide the required pick-up velocity. The pick-up velocity is the flow rate required to pick-up powder particles, including the "excess" powder that has accumulated at the edges as the flexible blade pushes the powder, which also takes into consideration the velocity at which the nozzles are moved across the substrate.

In order for the pick-up of substantially all the "excess" powder 14, with reference to FIG. 3, the pick-up velocity takes into consideration one or more of a width ($W_1$, $W_2$) of excess powder at the edge, a height ($H_1$, $H_2$) of powder at the edge, and characteristics or parameters of the powder 14 itself, e.g. the thickness of the powder 14. The central vacuum nozzle 34 may comprise one opening or aperture, or may comprises a plurality of individual nozzles which, together, form the central vacuum nozzle 34. One or more sensors ($S_1$, $S_2$, $S_3$) disposed on the nozzles 30, 32 and 34, respectively, or in the vicinity thereof, may be used to determine the height of excess powder 14 or a width of excess powder 14. As will be discussed below with regard to FIG. 6, this information, or data, may be fed back to a control system 600 to facilitate independent adjustment of one or more of (1) the size of the diameter of one or more of the nozzles, (2) a vertical distance of the nozzle from the substrate, and (3) an angle of orientation ($\alpha_1$, $\alpha_2$) of the nozzle(s) with respect to the substrate. The combination of the different nozzles 30, 32 and 34 and the flexible blade 22 constitutes an arrangement which provides a "clean" strip in the first portion 16 of the web, as shown in FIG. 2, while allowing distinct boundaries between the powder on the adjoining second and third portions 18 and 20 of the web 12.

Figure 4:
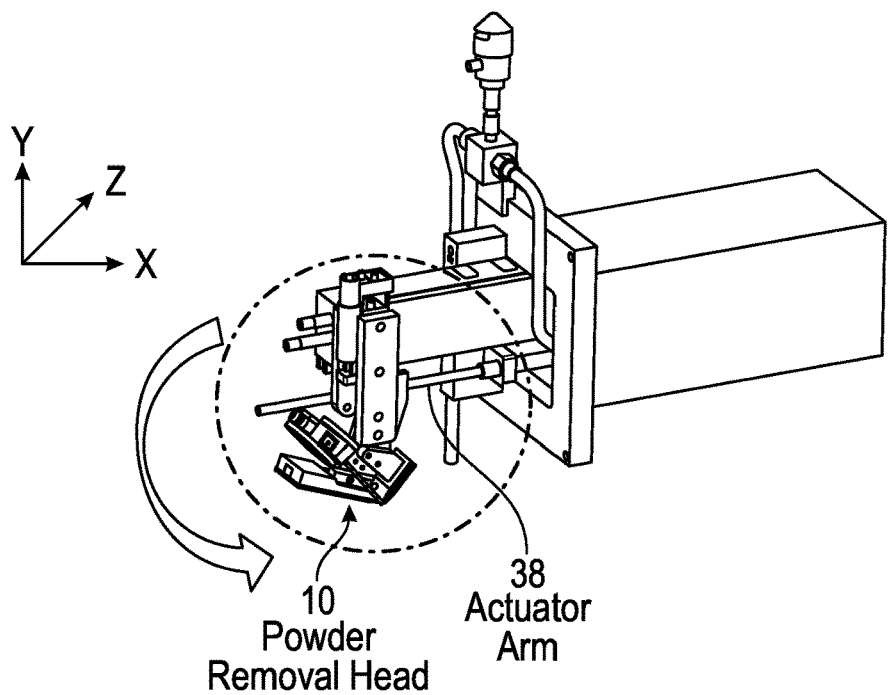
FIG. 4 illustrates a perspective view of the powder removal apparatus attached to an actuation arm in accordance with aspects of the present disclosure.
Figure 5:
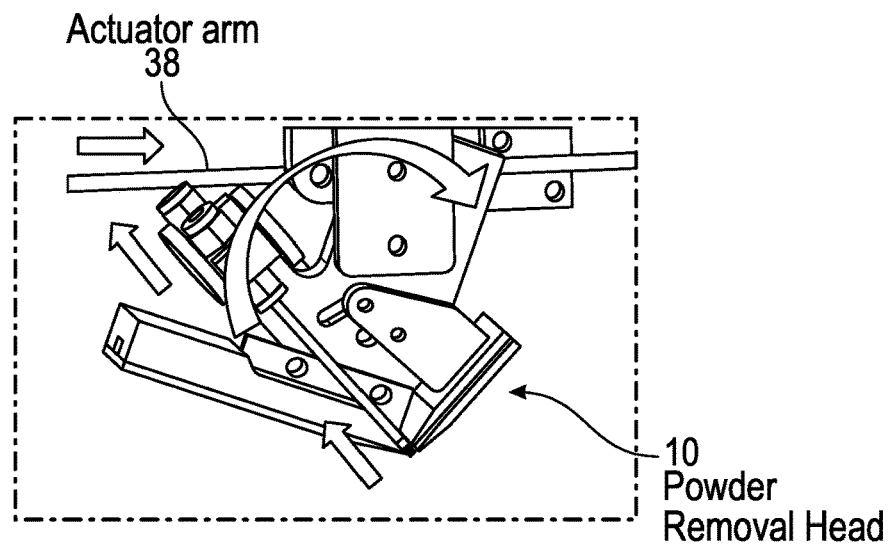
FIG. 5 illustrates a view of a circled section of the powder removal apparatus of FIG. 4, illustrating ranges of motion of the powder removal apparatus in accordance with aspects of the present disclosure.

Referring to FIGS. 4 and 5, the powder removal head 10 is attached to an actuator arm 38 that allows the powder removal head 10 to slide back and forth across the web 12. This motion to remove powder 14 from the first portion 16 of the web 12 can be done in one pass in a manner of seconds. In one configuration, motion of the actuator arm 38 can be associated with operation of a vacuum source (not shown), thereby facilitating a vacuuming operation to be carried out only when the actuator arm 38 is in motion (and traveling in a certain direction), and potentially for a predetermined time after its motion has been terminated. The straight-line powder removal shown for the first portion 16 in FIG. 2 makes it easier to cut the web in a specific area between two adjoining areas. This can be useful, for example, to separate devices being formed on adjoining regions, such as the second and third portions shown in FIG. 2. It will be apparent that powder removal may be carried out in geometries other than straight lines, with the actuator arm 38 guiding motion of the powder removal head 10 as desired. Another advantage of the present disclosure is that it permits this powder removal without any vibration being transferred to the web surface.

As also shown in FIGS. 4 and 5, another advantage of the present disclosure is that it allows for movement of the powder removal head 10 in a variety of directions, for example X, Y and Z directions, as well as angular rotation (e.g., tilting the powder removal head 10 up and down or side to side). It is noted that the powder 14 which has been removed from the center of the first portion 16 (see FIG. 2) by the central vacuum nozzle 34, and from edges of the first portion 16 by the edge vacuum nozzles 30 and 32, can be drawn through the separate vacuum tubes that the respective nozzles 30, 32 and 34 are connected to, and deposited in one or more receptacles.

In accordance with another aspect of the invention, the powder removal head 10 can be lowered (in a Y-direction) onto a surface of a substrate 12, operated to remove powder 14 from a defined area of powder, and lifted (in an opposite Y-direction) from the surface.

In accordance with a further aspect of the invention, the powder removal head 10 includes only one edge vacuum nozzle, with or without a central vacuum nozzle. In this configuration, the single edge vacuum nozzle vacuums up powder 14 along a single boundary of a powder area, and creates a clean area of web adjacent an edge of a powdered area.

Further, it is noted that, in order to obtain a substantially straight line across the surface of the substrate 12 (e.g., web), and substantially orthogonal to the edges of the substrate, in one implementation the substrate motion can be stopped to allow for moving the powder removal head 10 across the substrate 12, and then restarted after the pass by the powder removal head 10. In an alternative implementation, based on the speed of the moving substrate 12, the angle of approach and the speed of movement of the powder removal head 10 can be adjusted, such that, as it traverses the substrate 12 from one side to the other, while the substrate is moving, the powder 14 that is removed is a strip that is substantially orthogonal to the sides of the web.

Figure 6:
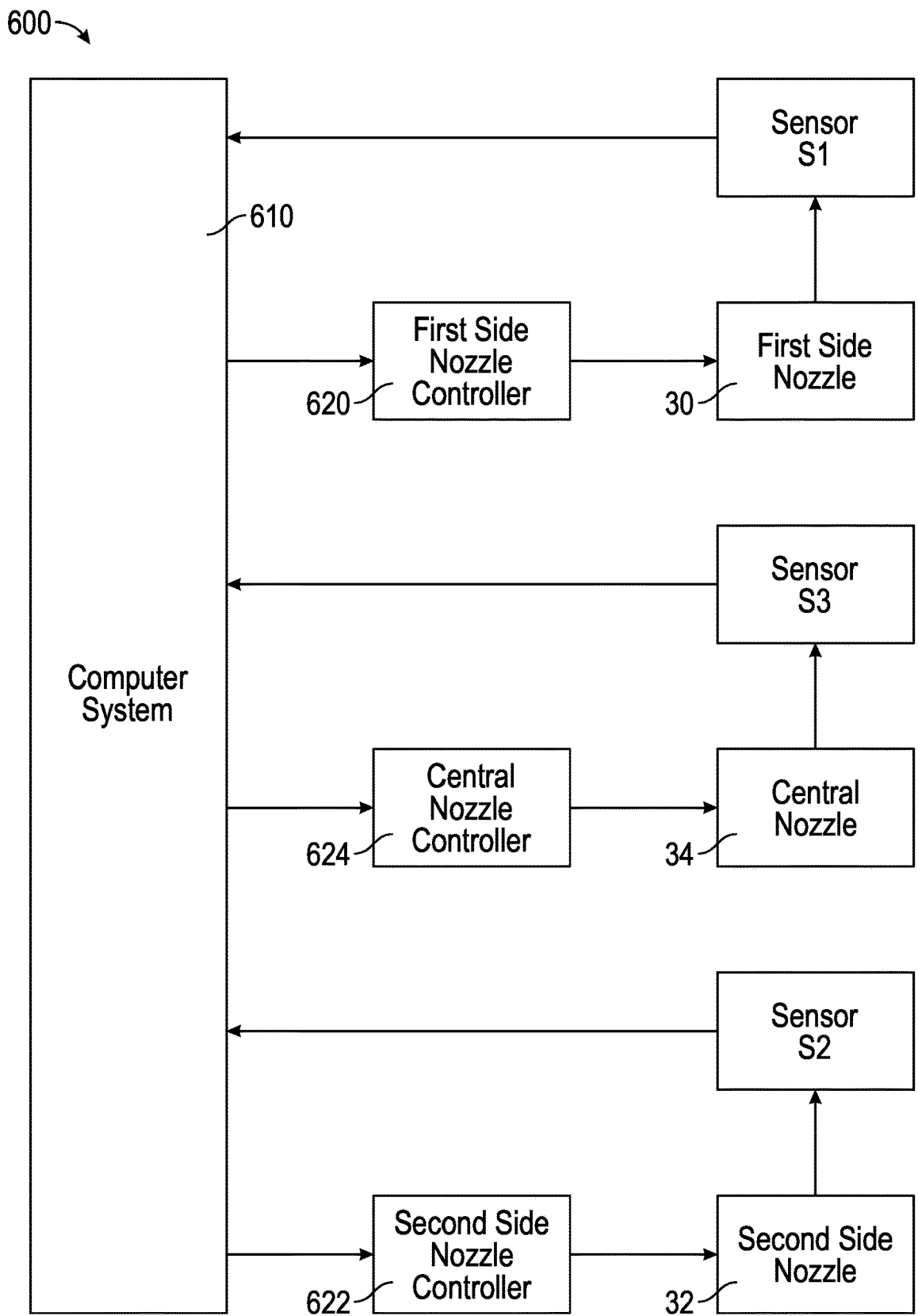
FIG. 6 illustrates a schematic diagram of a control system arrangement for controlling the operation of edge nozzles and a central nozzle in accordance with aspects of the present disclosure.

FIG. 6 illustrates a schematic diagram of a control system 600 for controlling the operation of the edge nozzles 30 and 32 and a central nozzle 34 in accordance with aspects of the present disclosure. Specifically, as discussed above with regard to FIG. 3, the control system 600 includes the sensors S1, S2 and S3, a computer system 610 (e.g., see FIG. 7), and a first side nozzle controller 620 for controlling operations of the first side nozzle 30, a second side nozzle controller 622 for controlling operations of the second side nozzle 32, and a central nozzle controller 624 for controlling operations of the central nozzle 34. Sensors S1 and S2 respectively sense not only parameters of the powder, such as height and width of the heaps or mounds of powder at the edges of the scraped portion, but also one or more of (1) the size of the diameter of one or more of the nozzles, (2) a vertical distance of the nozzle from the substrate, and (3) an angle of orientation ($\alpha_1$, $\alpha_2$) of the nozzle(s) with respect to the substrate. The sensor S3 senses this same information regarding the central nozzle 34 and any powder thereunder. The sensed information is sent to the computer system 610 (e.g., see FIG. 7), and, based on processing carried out by the computer system 610, the computer system 610 provides control signals to the controllers 620, 622 and 624 to respectively control the operations of the nozzles 30, 32 and 34. Although not shown in FIG. 6, the control system 600 can also control the actuator 38 to control operations of the powder removal head 10.

Figure 7:
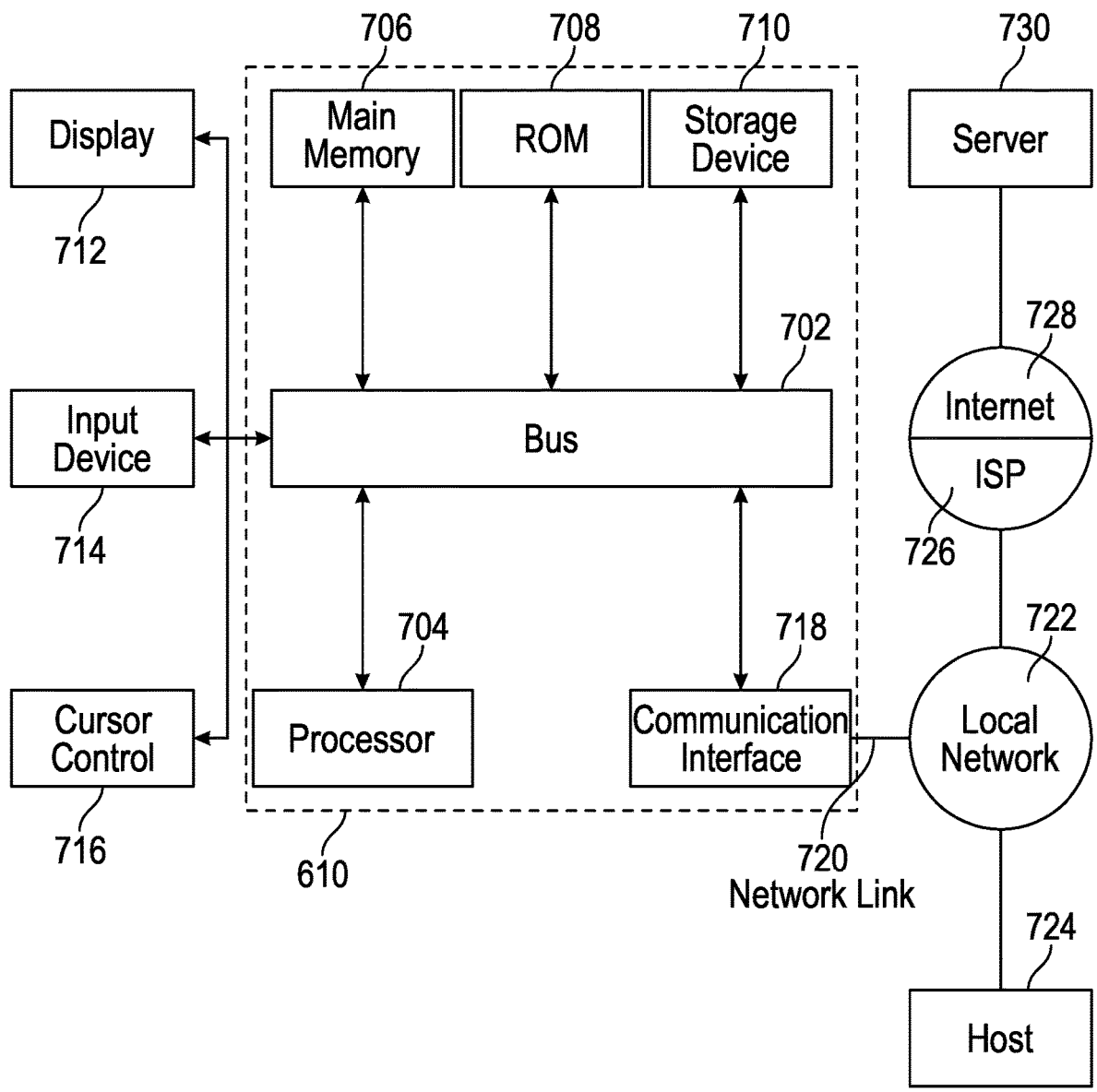
FIG. 7 is a block diagram showing an example computer system upon which aspects of this disclosure may be implemented.

FIG. 7 is a block diagram showing an example the computer system 610 shown in FIG. 6 upon which aspects of this disclosure may be implemented. The computer system 610 may include a bus 702 or other communication mechanism for communicating information, and a processor 704 coupled with the bus 702 for processing information. The computer system 700 may also include a main memory 706, such as a random-access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704.

The computer system 610 may further include a read only memory (ROM) 708 or other static storage device coupled to the bus 702 for storing static information and instructions for the processor 704. A storage device 710, such as a flash or other non-volatile memory may be coupled to the bus 702 for storing information and instructions.

The computer system 610 may be coupled via the bus 702 to a display 712, such as a liquid crystal display (LCD), for displaying information. One or more user input devices, such as the example user input device 714 may be coupled to the bus 702, and may be configured for receiving various user inputs, such as user command selections and communicating these to the processor 704, or to the main memory 706. The user input device 714 may include physical structure, or virtual implementation, or both, providing user input modes or options, and a cursor control 716 for controlling, for example, a cursor, visible to a user through display 712 or through other techniques, and such modes or operations may include, for example virtual mouse, trackball, or cursor direction keys.

The computer system 610 may include respective resources of the processor 704 executing, in an overlapping or interleaved manner, respective program instructions. Instructions may be read into the main memory 706 from another machine-readable medium, such as the storage device 710. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 710. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 610 may also include a communication interface 718 coupled to the bus 702, for two-way data communication coupling to a network link 720 connected to a local network 722. The network link 720 may provide data communication through one or more networks to other data devices. For example, the network link 720 may provide a connection through the local network 722 to a host computer 724 or to data equipment operated by an Internet Service Provider (ISP) 726 to access through the Internet 728 a server 730, for example, to obtain code for an application program.

It is noted that although the above description has primarily been presented in terms of removing powder in the environment of 3D printing, the apparatus and method of this disclosure is not limited to only powder removal for 3D printers, and they could be used in any situation where it is desired to remove powder from one portion of a substrate, while leaving the powder on adjoining portions of the substrate, with clear distinct boundaries between the portions where the powder is removed and where it remains.

In the following, further features, characteristics and advantages of the invention will be described by means of items:

Item 1. An apparatus is provided for removing powder from a substrate that has powder deposited thereon, including a blade configured to contact and move across a first portion of the substrate located between adjacent portions of the substrate to scrape powder from the first portion without scraping powder deposited on the adjacent portions, and a pair of edge vacuum nozzles and a central vacuum nozzle, located between the pair of edge vacuum nozzles, wherein each edge vacuum nozzles and the central vacuum nozzle is configured to move with the blade to remove powder from both edges of the first portion and a central region of the first portion, without removing powder deposited on the adjacent portions, after the powder has been scraped by the blade.

Item 2. An apparatus is provided for removing powder from a web that has powder deposited thereon, a flexible blade configured to contact and move across a first portion of the web located between a second portion of the web, on one side of the first portion, and a third portion of the web, on a second side of the first portion, opposite the second portion, to remove powder deposited on the first portion without removing powder deposited on the second and third portions, and a pair of edge vacuum nozzles, configured to move with the flexible blade across the first portion, comprised of a first edge vacuum nozzle located adjacent to a first edge of the flexible blade and adjacent to a boundary of the first and second portions of the web while the flexible blade moves across the first portion, and a second edge vacuum nozzle, located adjacent to a second edge of the flexible blade, opposite to the first edge of the flexible blade, and adjacent to a boundary of the first and third portions of the web while the flexible blade moves across the first portion, wherein the first and second edge vacuum nozzles are configured to respectively vacuum up powder, scraped by the flexible blade in the first portion.

Item 3. The apparatus of item 2, further including a central vacuum nozzle located adjacent to the flexible blade and configured to move with the flexible blade across the first portion, wherein the central vacuum nozzle is located between the first and second edge vacuum nozzles and is configured to vacuum up powder scraped by the flexible blade in the first portion between the boundaries of the first portion with the second and third portions.

Item 4. The apparatus of item 2 or 3, further comprising a pair of plates located on opposite sides of the flexible blade and configured to sandwich the flexible blade between the pair of plates.

Item 5. The apparatus of any of items 2-4, wherein the pair of plates are each comprised of a material which is less flexible than the flexible blade.

Item 6. The apparatus of any of items 2-5, wherein the flexible blade is located between the pair of plates in a manner to include a tip portion of the flexible blade which extends beyond lower edges of the pair of plates so that only the extending tip portion of the flexible blade contacts the first portion of the web.

Item 7. The apparatus of any of items 2-6, wherein the flexible blade is comprised of a squeegee style material.

Item 8. The apparatus of any of items 2-7, wherein the flexible blade, the pair of edge vacuum nozzles, the central vacuum nozzle and the pair of plates comprise a powder removal head, and wherein the powder removal head is coupled to an actuator arm configured to move the powder removal head across the first portion of the web.

Item 9. The apparatus of any of item 8, wherein the powder removal head is coupled to the actuator arm in a manner that allows the powder removal head to move in X and Y directions, and to rotate in angular directions relative to the web.

Item 10. The apparatus of any of items 8-9, wherein the powder removal head is coupled to the actuator arm in a manner that allows the powder removal head to move in a Z direction.

Item 11. The apparatus of item 1, wherein the substrate is comprised of a flexible web.

Item 12. The apparatus of items 1 or 11, wherein the blade is flexible.

Item 13. The apparatus of any of items 1 or 11, wherein the blade is inflexible.

Item 14. The apparatus of any of items 1 and 11-13, wherein the blade is hinged at an end, opposite an end contacting the substrate, to allow for movement on the blade vertically above the surface of the substrate as the blade moves across a surface of the substrate.

Item 15. The apparatus of any of items 1 -14, wherein each edge vacuum nozzle is configured to operate independently.

Item 16. The apparatus of any of items 1 -15, wherein each of the edge vacuum nozzles comprises an aperture of variable diameter.

Item 17. The apparatus of any of items 1 and 11-16, wherein an angle of orientation of each of the edge vacuum nozzles is configured to be independently adjustable with respect to the substrate.

Item 18. The apparatus of any of items 1 -18, further including a control system and one or more sensors associated with the edge vacuum nozzles; wherein data from the one or more sensors provides information to the control system, thereby facilitating dynamic adjustment of one or more of (1) the size of the diameter of one or more of the nozzles, (2) a vertical distance of the nozzle from the substrate, and (3) an angle of orientation of at least one of the edge nozzles.

Item 19. The apparatus of item 18 wherein the data from the one or more sensors comprises one or more of: a width of powder at least one of the edges of the powder; a height of powder at least one of the edges; and a parameter of the powder.

Item 20. A method for removing powder from a substrate that has powder deposited thereon, contacting and moving a blade across a first portion of the substrate located between adjacent portions of the substrate to scrape powder from the first portion without scraping powder deposited on the adjacent portions, and removing powder from both edges of the first portion and a central region of the first portion, without removing powder deposited on the adjacent portions, after the powder has been scraped by the blade using a pair of edge vacuum nozzles and a central vacuum nozzle, located between the pair of edge vacuum nozzles.

Item 21. The method of item 20, wherein the blade, the pair of edge vacuum nozzles, and the central vacuum nozzle comprise a powder removal head, the method further comprising moving the powder removal head via an actuator arm across the first portion of the substrate.

Item 22. The method of item 20, wherein the blade is hinged at an end, opposite an end contacting the substrate, the method further comprising moving the blade vertically above the surface of the substrate as the blade moves across a surface of the substrate.

Item 23. The method of item 20, further comprising operating the central vacuum nozzle and each edge vacuum nozzles independently of one another.

Item 24. The method of item 20, further comprising sensing data from the central vacuum nozzle and the edge vacuum nozzles via sensors associated with the central vacuum nozzle and the edge vacuum nozzles; wherein the data from the sensors provides information to a control system, to provide dynamic adjustment of one or more of: (1) a size of a diameter of one or more of the central vacuum nozzle and the edge vacuum nozzles; (2) a vertical distance of the one or more of the central vacuum nozzle and the edge vacuum nozzles from the substrate; and (3) an angle of orientation of at least one of the central vacuum nozzle and the edge vacuum nozzles with respect to the substrate.

Item 25. The method of item 24, wherein the data from the one or more sensors comprises one or more of: a width of powder at least one of the edges of the powder; a height of powder at least one of the edges; and a parameter of the powder.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. An apparatus for removing powder from a substrate that has the powder deposited thereon, comprising:

a blade configured to contact and move across a first portion of the substrate located between adjacent portions of the substrate to scrape the powder from the first portion without scraping the powder deposited on the adjacent portions; and a pair of edge vacuum nozzles and a central vacuum nozzle, located between the pair of edge vacuum nozzles, wherein each edge vacuum nozzles and the central vacuum nozzle is configured to move with the blade to remove the powder from both edges of the first portion and a central region of the first portion, without removing the powder deposited on the adjacent portions, after the powder has been scraped by the blade.

2. An apparatus for removing powder from a web that has the powder deposited thereon, comprising:

a flexible blade configured to contact and move across a first portion of the web located between a second portion of the web, on one side of the first portion, and a third portion of the web, on a second side of the first portion, opposite the second portion, to remove the powder deposited on the first portion without removing the powder deposited on the second and third portions; and a pair of edge vacuum nozzles, configured to move with the flexible blade across the first portion, comprised of a first edge vacuum nozzle located adjacent to a first edge of the flexible blade and adjacent to a boundary of the first and second portions of the web while the flexible blade moves across the first portion, and a second edge vacuum nozzle, located adjacent to a second edge of the flexible blade, opposite to the first edge of the flexible blade, and adjacent to a boundary of the first and third portions of the web while the flexible blade moves across the first portion, wherein the first and second edge vacuum nozzles are configured to respectively vacuum up the powder, scraped by the flexible blade in the first portion.

3. The apparatus of claim 2, further comprising:

a central vacuum nozzle located adjacent to the flexible blade and configured to move with the flexible blade across the first portion, wherein the central vacuum nozzle is located between the first and second edge vacuum nozzles and is configured to vacuum up the powder scraped by the flexible blade in the first portion between the boundaries of the first portion with the second and third portions.

4. The apparatus of claim 2, further comprising a pair of plates located on opposite sides of the flexible blade and configured to sandwich the flexible blade between the pair of plates.

5. The apparatus of claim 4, wherein the pair of plates are each comprised of a material which is less flexible than the flexible blade.

6. The apparatus of claim 4, wherein the flexible blade is located between the pair of plates in a manner to include a tip portion of the flexible blade which extends beyond lower edges of the pair of plates so that only the extending tip portion of the flexible blade contacts the first portion of the web.

7. The apparatus of claim 2, wherein the flexible blade is comprised of a squeegee.

8. The apparatus of claim 4, wherein the flexible blade, the pair of edge vacuum nozzles, the central vacuum nozzle and the pair of plates comprise a powder removal head, and wherein the powder removal head is coupled to an actuator arm configured to move the powder removal head across the first portion of the web.

9. The apparatus of claim 8, wherein the powder removal head is coupled to the actuator arm in a manner that allows the powder removal head to move in X and Y directions, and to rotate in angular directions relative to the web.

10. The apparatus of claim 9, wherein the powder removal head is coupled to the actuator arm in a manner that allows the powder removal head to move in a Z direction.

11. The apparatus of claim 1, wherein the substrate is comprised of a flexible web.

12. The apparatus of claim 1, wherein the blade is flexible.

13. The apparatus of claim 1, wherein the blade is inflexible.

14. The apparatus of claim 13, wherein the blade is hinged at an end, opposite an end contacting the substrate, to allow for movement on the blade vertically above the surface of the substrate as the blade moves across a surface of the substrate.

15. The apparatus of claim 1, wherein each edge vacuum nozzle is configured to operate independently.

16. The apparatus of claim 1, wherein each of the edge vacuum nozzles comprises an aperture of variable diameter.

17. The apparatus of claim 1, wherein an angle of orientation of each of the edge vacuum nozzles is configured to be independently adjustable with respect to the substrate.

18. The apparatus of claim 1, further comprising a control system and one or more sensors associated with the edge vacuum nozzles; wherein data from the one or more sensors provides information to the control system, thereby facilitating dynamic adjustment of one or more of (1) the size of the diameter of the edge vacuum nozzles, (2) a vertical distance of the edge vacuum nozzles from the substrate, and (3) an angle of orientation of the edge vacuum nozzles with respect to the substrate.

19. The apparatus of claim 18, wherein the data from the one or more sensors comprises one or more of: a width of the powder accumulated at least at one of edge of the first portion; or a height of the powder accumulated at least at one of the edges of the first portion.

20. A method for removing powder from a substrate that has the powder deposited thereon, comprising:

contacting and moving a blade across a first portion of the substrate located between adjacent portions of the substrate to scrape the powder from the first portion without scraping the powder deposited on the adjacent portions; and removing the powder from both edges of the first portion and a central region of the first portion, without removing the powder deposited on the adjacent portions, after the powder has been scraped by the blade using a pair of edge vacuum nozzles and a central vacuum nozzle, located between the pair of edge vacuum nozzles.

21. The method of claim 20, wherein the blade, the pair of edge vacuum nozzles, and the central vacuum nozzle comprise a powder removal head, the method further comprising moving the powder removal head via an actuator arm across the first portion of the substrate.

22. The method of claim 21, wherein the blade is hinged at an end, opposite an end contacting the substrate, the method further comprising moving the blade vertically above a surface of the substrate as the blade moves across the surface of the substrate.

23. The method of claim 20, further comprising operating the central vacuum nozzle and each edge vacuum nozzle independently of one another.

24. The method of claim 20, further comprising sensing data from the central vacuum nozzle and the edge vacuum nozzles via sensors associated with the central vacuum nozzle and the edge vacuum nozzles; wherein the data from the sensors provides information to a control system, to provide dynamic adjustment of one or more of: (1) a size of a diameter of one or more of the central vacuum nozzle and the edge vacuum nozzles; (2) a vertical distance of the one or more of the central vacuum nozzle and the edge vacuum nozzles from the substrate; and (3) an angle of orientation of at least one of the central vacuum nozzle and the edge vacuum nozzles with respect to the substrate.

25. The method of claim 24, wherein the data from the one or more sensors comprises one or more of: a width of the powder accumulated at least at one of the edges of the first portion powder; or a height of the powder accumulated at least at one of the edges of the first portion; and a parameter of the powder.

* * * * *